United States Patent
Whitby-Strevens et al.

(10) Patent No.: US 9,559,882 B2
(45) Date of Patent: Jan. 31, 2017

(54) APPARATUS AND METHODS FOR FLEXIBLE PROVISION OF CONTROL DATA IN LARGE DATA STRUCTURES

(71) Applicant: Apple Inc., Cupertino, CA (US)

(72) Inventors: Colin Whitby-Strevens, BenLomond, CA (US); Robert James Johnston, Carmichael, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/676,638

(22) Filed: Apr. 1, 2015

(65) Prior Publication Data

US 2015/0280895 A1 Oct. 1, 2015

Related U.S. Application Data

(60) Provisional application No. 61/973,780, filed on Apr. 1, 2014.

(51) Int. Cl.
*H04L 25/40* (2006.01)
*H04L 25/49* (2006.01)
*G09G 5/00* (2006.01)

(52) U.S. Cl.
CPC .............. *H04L 25/49* (2013.01); *G09G 5/006* (2013.01); *H04L 25/4908* (2013.01)

(58) Field of Classification Search
CPC ........ H04L 7/0008; H04L 1/004; H04L 7/041; H04L 25/03866; H04L 25/4908; H04L 25/49; G09G 5/006
See application file for complete search history.

(56) References Cited

U.S. PATENT DOCUMENTS 6,070,236 A * 5/2000 Winter ................ G06F 9/45508
703/26
6,618,383 B1 * 9/2003 Tomlins .............. H04L 12/5601
370/395.5
6,628,725 B1 * 9/2003 Adam ..................... H04L 1/004
341/60
7,961,656 B2 * 6/2011 Kwa ......................... G06F 3/14
370/252

(Continued)

OTHER PUBLICATIONS

Universal Serial Bus 3.1 Specification, Revision 1.0 dated Jul. 26, 2013.

(Continued)

*Primary Examiner* — Sophia Vlahos
(74) *Attorney, Agent, or Firm* — Gazdzinski & Associates, P.C.

(57) ABSTRACT

Methods and apparatus for the flexible provision of control data within large data structures. In one exemplary embodiment, DisplayPort is modified from its existing 8B/10B line coding to 128B/130B (or 128B/132B). In one embodiment, the 128B/130B (or 128B/132B) block includes: sixteen (16) eight (8) bit command or data symbols and a two (2) bit (or four (4) bit) synchronization header. The synchronization header may provide a fixed reference to the next command symbol (for example, the symbol immediately following the synchronization header). In one variant, each command symbol is split into a first and a second portion, where the first portion identifies a control function (control symbol), and the second portion provides a reference to the next command symbol.

20 Claims, 10 Drawing Sheets

(56) References Cited

U.S. PATENT DOCUMENTS

| | | | | |
|---|---|---|---|---|
| 8,705,633 | B2* | 4/2014 | Herrity | H04N 19/89 375/240.25 |
| 2003/0182613 | A1* | 9/2003 | Chu | H03M 13/33 714/758 |
| 2006/0256875 | A1* | 11/2006 | McClellan | H04L 25/03057 375/242 |
| 2007/0091896 | A1* | 4/2007 | Liu | H04J 3/1617 370/395.5 |
| 2008/0091931 | A1* | 4/2008 | McNutt | G05B 19/054 713/1 |
| 2010/0271389 | A1* | 10/2010 | Douglas | G09G 5/006 345/619 |

OTHER PUBLICATIONS

Universal Serial Bus Specification, Revision 2.0 dated Apr. 27, 2000.
Vesa DisplayPort Standard—Version 1, Revision 1 a, dated Dec. 2007.
Vesa DisplayPort Standard—Version 1, Revision 2, dated Jan. 2010.
VESA DisplayPort Standard—Version 1, Revision 2a, dated May 23, 2012.

* cited by examiner

APPARATUS AND METHODS FOR FLEXIBLE PROVISION OF CONTROL DATA IN LARGE DATA STRUCTURES

PRIORITY

The present application claims priority to co-owned, U.S. Provisional Patent Application Ser. No. 61/973,780 filed on Apr. 1, 2014 and entitled "APPARATUS AND METHODS FOR FLEXIBLE PROVISION OF CONTROL DATA IN LARGE DATA STRUCTURES", the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The disclosure relates generally to the field of electronics devices, and networks thereof. More particularly, portions of the disclosure are directed to, inter alia, methods and apparatus for flexibly providing control data within large data structures.

2. Description of Related Technology

DisplayPort (see, inter alia, www.DisplayPort.org) is an exemplary digital display interface technology specified by the Video Electronics Standards Association (VESA). Extant DisplayPort technology is an extensible digital interface solution that is designed for a wide variety of performance requirements, and broadly supports devices such as PCs, monitors, panels, projectors, and high definition (HD) content applications. Current incarnations of the standard specify support for simple networking of digital audio/visual (A/V) interconnects, intended to be used primarily between an arbitrary assembly of multimedia "sources" (e.g., computers or CPUs) and "sinks" (e.g. display monitors, home-theater system, etc.).

DisplayPort provides, inter alia, unidirectional transmission of audio and video data from source nodes to sink nodes, and an auxiliary channel (back-channel) for capability and status information to be sent from the sink(s) to the source. The primary and auxiliary channels operate in "master/slave" mode under control of the master node. The master node controls both the low level transmission of data between source and sink, and the higher level management of the display and networking. Generally, the source node is the master node; however, it is appreciated that these functions (data source and network master) are logically separate and other network configurations may have different configurations, e.g., a sink node could be a master node.

The typical DisplayPort connection includes multiple data lanes (e.g. 1, 2, or 4 data pairs), and an embedded clock. Unlike other standards (e.g., HDMI, DVI), DisplayPort embeds the clock in the data signal transmission, and requires clock regeneration at the receiver. Audio signals may be optionally included, but are not required. The bi-directional auxiliary channel carries management and device control data. The data transmission protocol in DisplayPort is based on micro-packets which may be transmitted isochronously.

Existing DisplayPort symbols are based on 8B/10B encoding (i.e., ten (10) bits are used to represent an eight (8) bit data or control symbol). This represents a signaling overhead of approximately twenty percent (20%) (i.e., the number of information bits conveyed divided by the number of bits actually transmitted). For reasons explained in greater detail herein, other bus technologies provide much lower signaling overhead (e.g., 128B/130B, 128B/132B, etc.), but cannot support isochronous data applications (e.g., streaming video and audio, etc.). Ideally, improvements to the DisplayPort encoding scheme should seek to improve signaling overhead, while still supporting isochronous data applications. More generally, improved methods are needed for enabling flexible provision of control data within large data structures.

SUMMARY

The present disclosure satisfies the foregoing needs by providing, inter alia, methods and apparatus for flexible provision of control data within large data structures.

A first method for flexible provision of control data within large data structures is disclosed. In one embodiment, the method includes: generating a stream of data symbols from content; injecting one or more control symbols within the stream of data symbols to form a transport stream; subdividing the transport stream into large data structures, the subdividing including replacing at least a first control symbol with a command symbol; and where the command symbol is configured to reference another command symbol associated with a second control symbol; and transmitting the large data structures.

A method for flexibly receiving control data within large data structures is disclosed. In one embodiment, the method includes: responsive to receiving a large data structure, identifying a first one of one or more command symbols associated with a first control symbol; identifying at least one subsequent command symbol based on the identified first one of the one or more command symbols, where the at least one subsequent command symbol is associated with a second control symbol; and extracting one or more data symbols in accordance with the first and second control symbols.

An apparatus configured to flexibly provision and/or receive control data within a large data structure is disclosed. In one embodiment, the apparatus includes: a processing device; one or more ports; a storage device in data communication with the processing device, the storage device comprising a plurality of instructions configured to, when executed, cause the processing device to generate a stream of data symbols from content; insert one or more control symbols within the stream of data symbols to form a transport stream; subdivide the transport stream into large data structures, the subdivision comprising replacement of at least a first control symbol with a first command symbol; and transmit the large data structures via the one or more ports; where the first command symbol is configured to reference a second command symbol associated with a second control symbol.

A non-transitory computer readable apparatus including instructions to flexibly provision and/or receive control data within a large data structure is disclosed. In one embodiment, the instructions when executed by a processor are configured to cause the apparatus to: responsive to receiving a large data structure, identify a first one of one or more command symbols associated with a first control symbol; identify at least one subsequent command symbol based on the identified first one of the one or more command symbols, the at least one subsequent command symbol being associated with a second control symbol; and extract one or more data symbols in accordance with the first and second control symbols.

Other features and advantages of the present disclosure will immediately be recognized by persons of ordinary skill in the art with reference to the attached drawings and detailed description of exemplary embodiments as given below.

Figure 1:
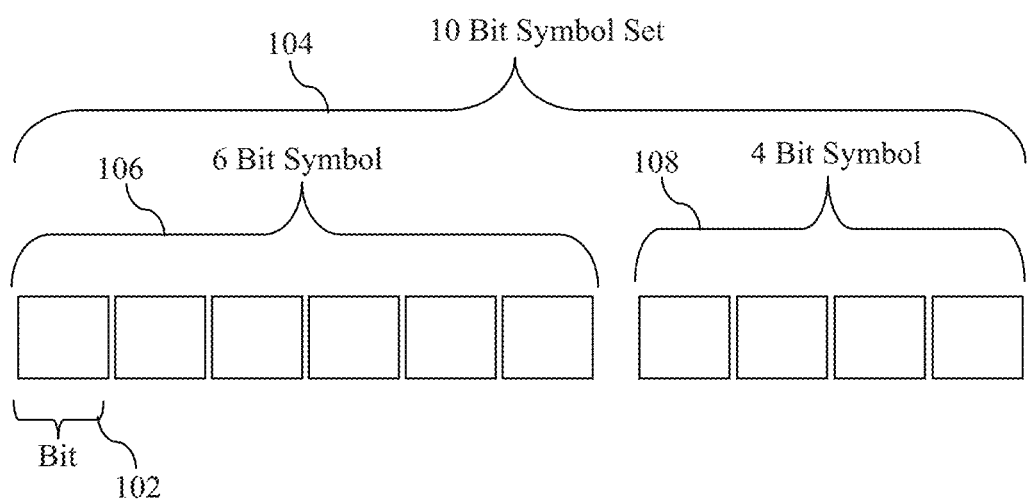
FIG. 1 is a logical block diagram representation of a prior art 8B/10B encoding scheme.

All Figures © Copyright 2014-2015 Apple Inc. All rights reserved.

DETAILED DESCRIPTION

Reference is now made to the drawings, wherein like numerals refer to like parts throughout.
Overview The present disclosure describes, inter alia, methods and apparatus for the flexible provision of control data within large data structures. As used herein, the term "large" as used in the context of data structures means a data structure that is formed from multiple data structures (e.g., command or data symbols) and a demarcation element (e.g., header, pre-amble, mid-amble, post-amble, etc.). The header section indicates the presence of at least a first command symbol. In one variant, each command symbol includes a control symbol and a pointer to the location of the next command symbol within the large data structure. In one variant, control symbol transactions indicate control flow events, which are necessary to control and maintain the physical layer link between transceivers.

In one exemplary embodiment, DisplayPort is modified to incorporate a modified large data structure signaling (rather than, or in addition to, the existing 8B/10B format). For example, some embodiments may perform link training in 8B/10B format, and then switch to, e.g., 128B/130B or 128B/132B for normal operation. In one embodiment, the large data format is based on 128B/130B which includes: sixteen (16) eight (8) bit command or data symbols and a two (2) bit synchronization header. In another embodiment, the large data format is based on 128B/132B which includes: sixteen (16) eight (8) bit command or data symbols and a four (4) bit synchronization header. Those of ordinary skill in the related arts will readily appreciate that the size of the data structure is a matter of design choice to align with other popular processor and bus technologies. Other data structure sizes (e.g., 32 bit, 64 bit, 256 bit, etc.) may be readily interchanged, given the contents of the present disclosure.

In one exemplary embodiment, the synchronization header provides a fixed reference to the next command symbol (e.g., a command symbol immediately follows the synchronization header, etc.). In other embodiments, the synchronization header may provide an indication as to whether or not the large data structure contains one or more command symbols, or only consists of data symbols.

More generally, various principles described herein are useful for any data application (time sensitive or otherwise) which requires the ability to discriminate between the constituent components of an otherwise large data structure.
Detailed Description of Exemplary Embodiments Exemplary embodiments of the present disclosure are now described in detail. While these embodiments are primarily discussed in the context of a Video Electronics Standards Association (VESA) DisplayPort audio/visual (A/V) component network, it will be recognized by those of ordinary skill that the present disclosure is not so limited. In fact, the various portions of the disclosure are useful in, inter alia, a variety of communications protocols which heretofore could not support (or supported only with difficulty) time-sensitive applications.

As used herein, the term "bus" refers without limitation to any physical and/or logical path for data transfer, transmission, or receipt. Common examples of bus technologies include, without limitation: USB (Universal Serial Bus™) (e.g., USB 2.0, USB On-The-Go (OTG), USB 3.0, etc.), FireWire™, Thunderbolt™, High Definition Multimedia Interface™ (HDMI), DisplayPort™, etc.

As used herein, the term "circuitry" refers to any type of device having any level of integration (including without limitation ULSI, VLSI, and LSI), and irrespective of process or base materials (including, without limitation Si, SiGe, CMOS, GaAs, and organic circuits), as well as discrete components such as resistors, diodes, capacitors, inductive reactors, and any combinations of the foregoing.

As used herein, the term "display" refers without limitation to any visual display device including, e.g., LCD, plasma, TFT, CRT, LED (e.g., OLED), incandescent, fluorescent, and other types of indicator or image display technologies.

As used herein, the term "DisplayPort" refers without limitation to apparatus and technology compliant with e.g., "VESA DisplayPort Standard"—Version 1, Revision 1a, dated Jan. 11, 2008; "VESA DisplayPort Standard"—Version 1, Revision 2, dated Jan. 5, 2010; as well as derivative specification including, without limitation, so-called "Mini DisplayPort" technology, "embedded DisplayPort" (eDP), "Mobility DisplayPort" (MyDP), and/or "internal Display- Port" (iDP), each of the foregoing (and any subsequent revisions thereof) being incorporated herein by reference in its entirety.

As used herein, the term "memory" includes any type of integrated circuit or other storage device adapted for storing digital data in a non-transitory computer readable medium including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), RISC, general-purpose (CISC) processors, microprocessors, gate arrays (e.g., FPGAs), programmable logic devices (PLDs), reconfigurable compute fabrics (RCFs), array processors, secure microprocessors, and application-specific integrated circuits (ASICs). Such digital processors may be contained on a single unitary integrated circuit (IC) die, or distributed across multiple components.

As used herein, the term "Peripheral Component Interface" (PCI) refers without limitation to apparatus and technology compliant with PCI including "PCI Express® Base Specification", Revision 3.0 dated Nov. 10, 2010, the foregoing (and any subsequent revisions thereof) being incorporated herein by reference in its entirety.

As used herein, the term "sink" refers without limitation to a node which consumes data/content, and the term "source" refers without limitation to a node which generates data/content.

As used herein "synchronous" timing refers to data streams which have a regular interval between the control and data transactions. As used herein, "asynchronous" timing refers to data streams which do not have a regular interval between control and data transactions. As used herein, "isochronous" timing refers to data streams which promise to deliver a certain amount of data at regular time intervals, but where the actual data transactions may be "bursty" and irregular.

As used herein, the term "Universal Serial Bus" (USB) refers without limitation to apparatus and technology compliant with "Universal Serial Bus Specification", Revision 2.0 dated Apr. 27, 2000; "Universal Serial Bus 3.1 Specification", Revision 1.0 dated Jun. 6, 2011, each of the foregoing (and any subsequent revisions thereof) being incorporated herein by reference in its entirety.

Existing Line Codes—

Commonly used interconnect protocols typically define one or more streams of symbols to be transmitted, such as from a transmitter to a receiver. Each such stream includes a mixture of control symbols and data symbols. The physical layer of such protocols is required to transport these symbols using appropriate electrical signaling and symbol encoding techniques.

Existing DisplayPort based systems employ a so-called IBM 8B/10B encoding scheme. Referring now to FIG. 1, the symbol layout of an exemplary 8B/10B encoding scheme is shown. A maximum of eight (8) bits of data 102 are included on a ten (10) bit symbol set 104. As shown, each 8B/10B ten (10) bit symbol is actually split between a 5B/6B portion 106 and a 3B/4B portion 108. Since a ten (10) bit symbol provides only eight (8) bits of data, the 8B/10B encoding scheme has a twenty percent (20%) signaling overhead.

The 5B/6B portion 106 and 3B/4B portion 108 are determined according to a straightforward translation implemented within look-up tables. The 5B/6B translation converts five (5) bits of data (representing 0-31) to a six (6) bit symbol; the 3B/4B translation converts three (3) bits of data (representing 0-7) to a four (4) bit symbol. These data symbols can be written in shorthand as:

$$D.x.y$$

Where:

x is the value representing 0-31, and y is the value representing 0-7.

The translations ensure that certain desirable electromagnetic interference (EMI) mitigation properties are present. Specifically, no more than five (5) consecutive bits will have the same value, and the difference between the numbers of zeros (0) and ones (1) (also referred to as running disparity) cannot exceed two (2). These desirable properties may be used to improve noise immunity, enable transmission over certain types of media, etc.

DisplayPort also defines certain special symbols (or control characters or control symbols) that may be sent in place of a data symbol. These special symbols indicate a control flow event within the physical layer or link layer, e.g., start-of-frame, end-of-frame, skip, symbol alignment, etc. These special symbols are also referred to as K.x.y symbols; K.x.y symbols are unique from D.x.y symbols (i.e., every K.x.y symbols is not a valid D.x.y symbol).

Figure 2:
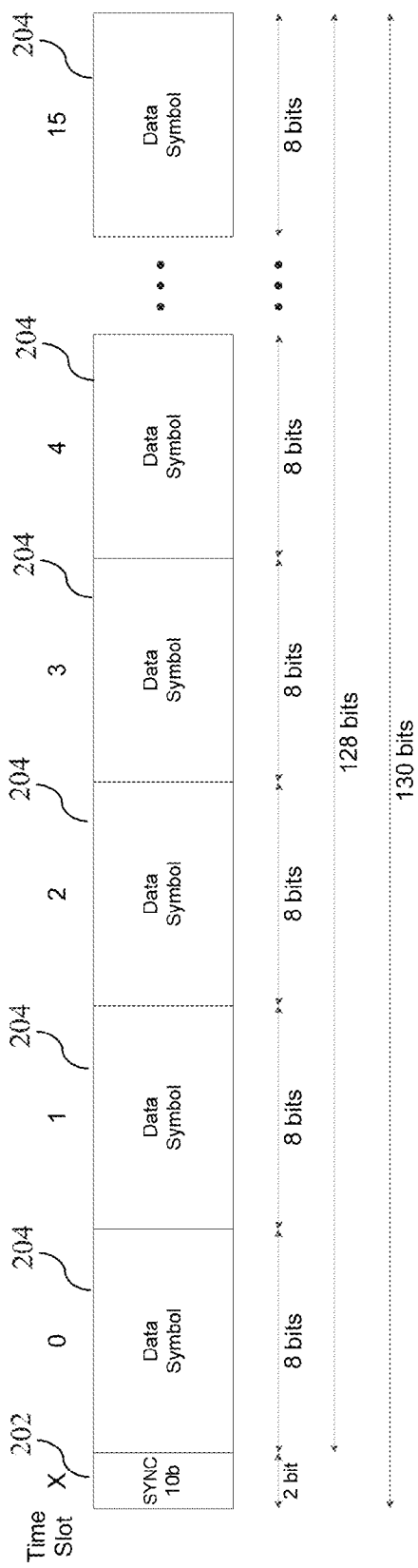
FIG. 2 is a logical block diagram representation of a 128B/130B data only block which contains only data or fill, useful in accordance with various aspects of the present disclosure.
Figure 3:
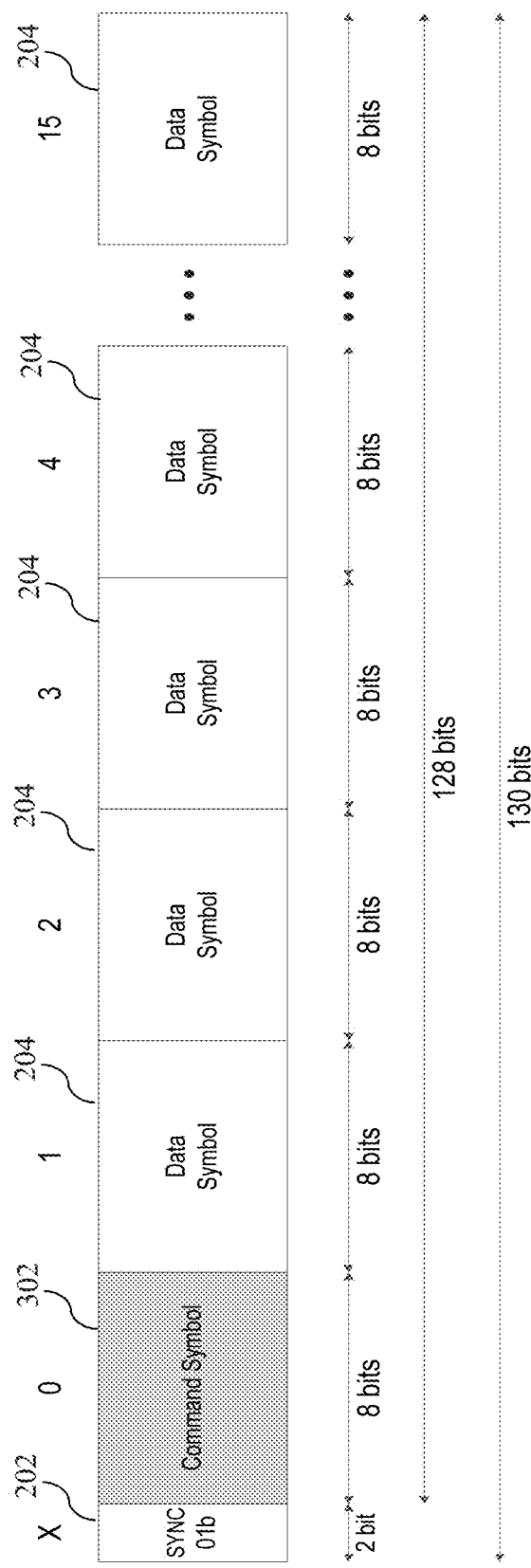
FIG. 3 is a logical block diagram representation of a 128B/130B command block which may contain control symbols, data symbols, or null symbols, useful in accordance with various aspects of the present disclosure.

In contrast to DisplayPort, Peripheral Component Interconnect-Express (PCIe) (Revision 3.0) and its variants are based on 128B/130B. Every 128B/130B block includes a two (2) bit header, and a 128-bit payload in raw form (without translation, modification, etc.) The payload consists of sixteen (16) eight (8) bit symbols. The header indicates whether the payload is data-only or contains a control symbol. Specifically, as shown in FIG. 2, a sync header 202 with the value #10b indicates a data block which contains only data or fill (i.e., a null value). Each eight (8) bit byte is scrambled to generate an eight (8) bit data symbol 204. If the sync header 202 has the value #01b, then it is a command block (see FIG. 3). The first symbol following the command block sync header is a command symbol 302. The command symbol is a scrambled eight (8) bit command code. The remaining symbols are data symbols (or fill) 204 128B/130B does not reserve any symbols for special purposes (e.g., special control symbols, etc.) Recent versions of USB (e.g., USB 3.1) are based on a 128B/132B variant, which uses a four (4) bit header and a 128-bit payload in raw form (without translation, modification, etc.)

Neither 128B/130B nor 128B/132B provide the signal integrity and robustness benefits offered by 8B/10B; this is typically resolved with software error correction on an as-needed basis, etc. Moreover, both 128B/130B and 128B/132B only support command symbols 302 at specific locations (i.e., immediately following a sync header 202).

Isochronous Data—

As previously alluded, differences in line coding techniques have historically been caused by a difference in application requirements. One such area is the use of data structure sizes; for example, DisplayPort (which is traditionally directed to streaming video applications) uses a ten (10) bit line code symbol to convey an eight (8) bit control or data symbol. The extraneous bits offer certain desirable coding properties (robustness, running disparity, etc.) which are important for physical signal propagation over the cable. In contrast, Universal Serial Bus (USB) and/or PCIe have recently used larger data structure sizes (e.g., 32 bits, 64 bits, 128 bits, etc.) so as to align with processor word size boundaries.

Another difference in line coding techniques is frequency of control signaling. Control symbols are symbols that are used by the transceivers to control data flow in the physical layer. Common examples of control flow events include, e.g., synchronization events, reset events, bus arbitration, etc. In most "best effort" type applications, the physical layer relies on regularly occurring control symbols. Examples of protocols that have "regular" control symbols include without limitation: Fibre Channel, PCIe, USB, etc. These regular protocols are designed to be bandwidth efficient; however, such protocols typically operate in an asynchronous manner (time insensitive) with respect to the software applications. Asynchronous operation allows the physical layer to use as much time and/or bandwidth as necessary (that the network can provide) in order to transmit a control symbol. In some implementations, the physical layer exploits so-called "ordered sets", in which, for example, a 64 bit pattern or a 128 bit pattern is treated either as containing data symbols or containing control symbols, but not both.

In contrast to the best effort applications, isochronous applications must support the insertion of a number of control symbols at any arbitrary point in the stream. An example of such an "arbitrary" protocol is DisplayPort, FireWire, etc. In particular, application software provides data and control symbols to the physical layer which is timed according to a fixed clock. The physical layer is (typically) required to transmit a control symbol in the same amount of time as it transmits a data symbol.

The aforementioned differences in application requirements have steered the state of the art to optimize bus technologies for either isochronous or asynchronous applications, but not both. Within this context, the present disclosure enables the flexible provision of control data within large data structures. Specifically, in one exemplary embodiment, both data and control are encoded within a 128B/130B (or 128B/132B) encoding scheme, so as to enable arbitrary control symbol insertion at any point within the data structure. By adding arbitrary control symbol capabilities to a much larger data structure, the exemplary embodiments can support the necessary timing requirements to enable isochronous applications.

Methods—

In one aspect of the present disclosure, a method for encoding large data structures (e.g., 128B/130B and/or 128B/132B blocks) so as to enable arbitrary control symbol or data symbol insertion at any point in the stream of large data structures is disclosed.

As previously noted, isochronous protocols must support arbitrary control symbol insertion for e.g., audio/visual (AV) applications. The DisplayPort Multistream Transport (MST) format additionally requires that there must be at least one control symbol every 64 bytes, and only uses a limited number of control functions. Accordingly, one exemplary implementation of a DisplayPort MST 128B/130B protocol, includes a two (2) bit header (e.g., sync header 202 in FIGS. 2 and 3), and a 128-bit payload composed of a number of symbols. In another exemplary implementation, the DisplayPort MST is modified for 128B/132B protocol by using a four (4) bit header, and a 128-bit payload composed of a number of symbols.

The 128-bit payload consists of sixteen (16) eight (8) bit symbols which may be either command symbols or data symbols. Each "command symbol" (e.g., command symbol 302 in FIG. 3) includes two parts: the first portion identifies the control symbol or function, and the second portion provides a pointing reference to the location of the next command symbol, e.g., a relative indication (such as the number of following data symbols), an absolute indication (such as an absolute symbol number), etc.

Since the command symbols are "linked" to one another, there may be certain instances where an unlucky bit error breaks the chain of links. Consequently, in one robust variant, the symbol immediately following (or otherwise a predetermined relationship to) the header is always a "command symbol". By implementing a fixed relationship between the header and the command symbol, the link can be recovered even where a command symbol has been corrupted. In another variant, the command symbol may include forward error correction information, parity information, etc. Such information may allow the command symbol to be recovered where there is not significant corruption.

In still other implementations, it may be desirable to support long unbroken strings of data. Accordingly, certain variants may use a header that identifies whether the following payload includes a command symbol or is "data-only". In such variants, the header may identify that a command symbol or a data symbol immediately follows the header or provide some other pointing reference, e.g., a relative indication (such as the number of following data symbols), an absolute indication (such as an absolute symbol number of the next command symbol), etc.

Figure 4:
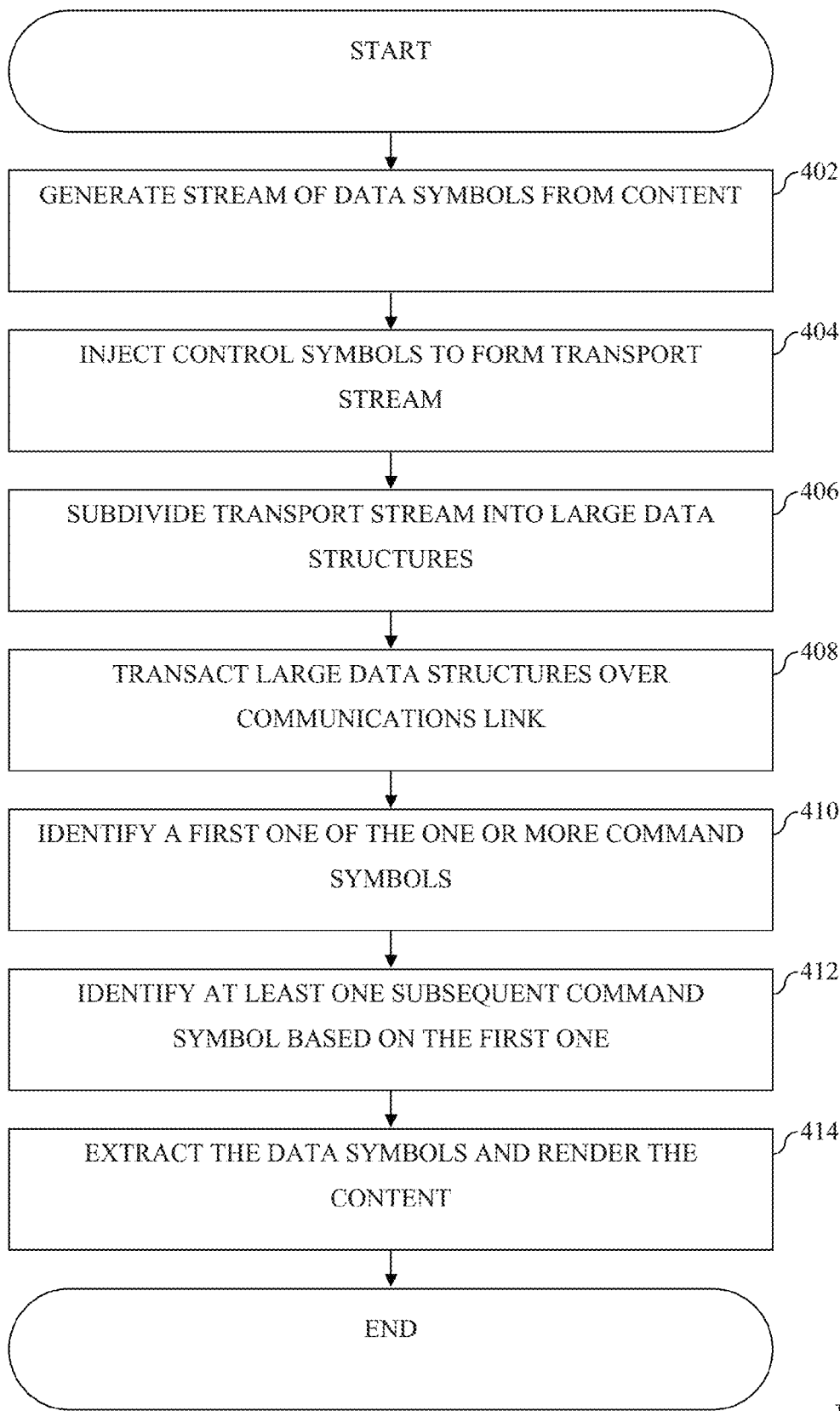
FIG. 4 is a logical flow diagram of one method for flexible provision of control data within large data structures, in accordance with the present disclosure.

Referring now to FIG. 4, one method for flexible provision of control data within large data structures is illustrated. In one embodiment, the data path is composed of one or more data path segments or hops between a transmitter (source of content) and a receiver (sink for content). In one implementation, the data path is a unidirectional bus. In other implementations, the data path is a bi-directional bus. In still other implementations, the bus may be a hybrid bus incorporating both unidirectional and bi-directional capabilities. While the following description is made with respect to a direct link between a transmitter and a receiver for clarity, it is appreciated that the present disclosure is intended for use within complex network topologies (e.g., tree, mesh, star, ring, etc.)

At step 402 of the method 400, the transmitter generates a stream of data symbols from content. In one embodiment, the content includes audio/visual (AV) data, e.g., video, movies, music, etc. DisplayPort sources may dynamically generate content and/or retrieve content from tangible media. Common examples of dynamically generated content include, e.g., video recording, audio recording, game data, etc. Common examples of content retrieved from tangible media include without limitation, content stored via optical disk (e.g., compact disc (CD), digital video disc (DVD), Blu-ray®, etc.) and non-transitory computer readable media (e.g., hard disk drive (HDD), flash, etc.).

In one exemplary embodiment, the data or content is a stream of audio/visual data. The stream of audio/visual data may additionally be packetized. In other embodiments, the content is contiguous data. Common examples of content include, without limitation, picture data, video data, audio data, metadata (e.g., gyroscopic data, time stamps, location data, etc.). Those of ordinary skill in the related arts will further appreciate that while the following descriptions are described in terms of temporal streams, the payload data may be generated, e.g., asynchronously (i.e., no relation between the amount of data and time), synchronously (i.e., a fixed amount of data at a fixed time interval), isochronously (i.e., a guaranteed amount of data transferred no later than a specified time), etc.

In one exemplary embodiment, DisplayPort data includes streaming video data including, without limitation: video data organized in scan lines according to appropriate resolution, e.g., 480p (720×480 progressive scan), 5'76p (720×576 progressive scan), 720p (1280×720 progressive scan), 1080i (1920×1080 split into two interlaced fields of 540 lines), 1080p (1920×1080 progressive scan), 2160p (3840×2160 progressive scan), 4320p (7680×4320 progressive scan), 8640p (15360×8640 progressive scan), etc.

In one embodiment, the data symbols are bytes of data (eight (8) bits). In other embodiments, the data symbols may be words of any size (e.g., 6 bits, 7 bits, 8 bits, 12 bits, 14 bits, 16 bits, 32 bits, 64 bits, etc.) In still other embodiments, the data symbols may incorporate certain format requirements, e.g., scrambling, encryption, parity, etc.

At step 404 of the method 400, the transmitter injects one or more control symbols within the data symbols to form a transport stream. In one exemplary embodiment, the one or more control symbols are interposed within the transport stream in accordance with physical layer requirements of the communication link. For example, within DisplayPort, control symbols include, without limitation, frame start (FS), frame end (FE), blanking start (BS), blanking end (BE), scrambling start (SS), scrambler end (SE), scrambler reset (SR), etc. These control symbols are interpreted by the physical transmitter and receiver apparatus to configure physical layer parameters and control data flow (e.g., synchronize transmit and receive scrambling, etc.) DisplayPort has approximately eight (8) commonly used control functions, and four (4) less frequently used control functions (twelve (12) in total). The relatively small number of DisplayPort control functions may be represented with four (4) bits (which can represent up to sixteen (16) distinct control functions).

Control symbols directly affect the operation of the physical link, and are of a sensitive nature (e.g., with respect to time and/or position within the transport stream). For example, a transmitter that inserts a scrambler reset within the transport stream immediately resets its scrambler for the next data symbol. Consequently, in order to properly decode the stream, the receiver must reset its scrambler at the same point in the stream. A difference of even a single symbol would result in the receiver receiving scrambled gibberish.

Due to the importance of control symbols, some implementations may add error correction/detection schemes and/or robust control symbol protection. Other implementations may accept performance degradation where a control symbol is corrupted, relying instead on the other aspects of link recovery (e.g., periodic resynchronization, etc.)

In some embodiments, the control symbols are injected according to a minimum requirement. For example, within one implementation of DisplayPort 128B/130B and 128B/132B variants, every block starts with a control symbol. In other embodiments, every second (or third, or fourth) block starts with a control symbol. In still other embodiments, a block may or may not start with a control symbol.

At step 406 of the method 400, the transmitter subdivides the transport stream into large data structures for transport. In one embodiment, the large data structure includes a header (or a similar demarcation, e.g., pre-amble, mid-amble, post-amble, etc.) and a payload. In alternate embodiments, the large data structure may additionally incorporate elements such as, e.g., addressing, error checking, length information, forward error correction, etc.

In one exemplary embodiment, the payload has a fixed length. In other embodiments, the payload may have a variable length. The payload may incorporate one or more of, e.g., data symbols, control symbols, null symbols, etc.

In one exemplary DisplayPort 128B/130B (or 128B/132B) embodiment, each control symbol of the transport stream is replaced with (or causes the generation of) a command symbol (eight (8) bits). As previously noted, one exemplary 128-bit payload consists of sixteen (16) eight (8) bit symbols which may be either command symbols, data symbols or null symbols.

Figure 5:
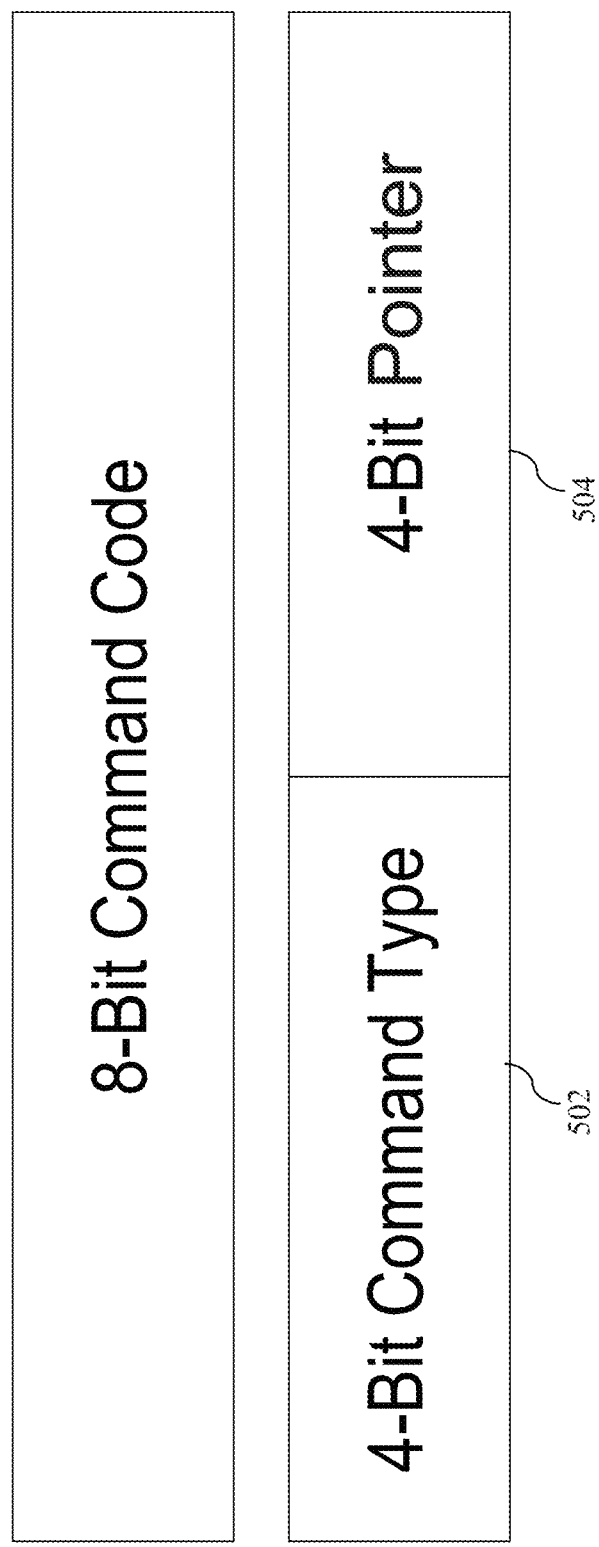
FIG. 5 is a logical block diagram representation of a command symbol, in accordance with the present disclosure.

As shown in FIG. 5, each "command symbol" includes two parts: a first four (4) bit portion 502 identifies one control function from the set of twelve (12) DisplayPort control symbols, and the second four (4) bit portion 504 provides a pointer, which comprises a relative pointing reference to the location of the next command symbol. In a related variant, the second four (4) bit portion 504 provides an absolute reference to the location of the next command symbol.

Figure 6:
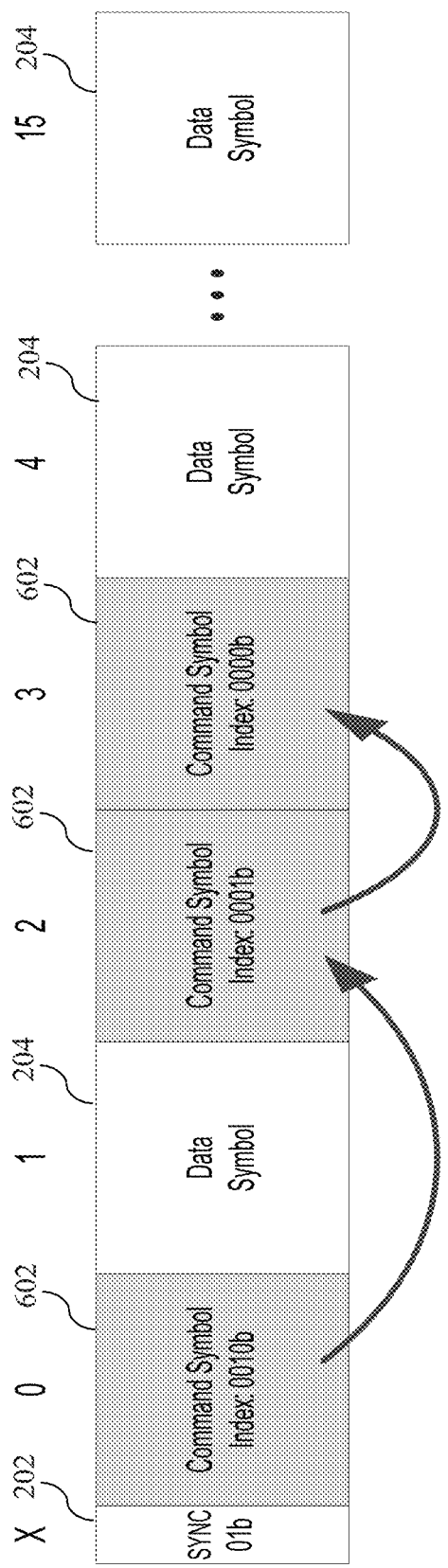
FIG. 6 is a logical block diagram representation of one exemplary DisplayPort Multistream Transport (MST) 128B/130B block.

FIG. 6 illustrates one exemplary DisplayPort MST 128B/130B block. As shown, the block includes command symbols 602 at locations zero (0), two (2), and three (3); the remaining symbols are data 204. As shown in FIG. 6, each command symbol comprises a command symbol index having sufficient number of bits to indicate the location of the subsequent command symbol, if any, in the command block. For example, command symbol zero (0) has an index of #0010b; this value indicates the presence of another command symbol two symbols away, at command symbol two (2). Command symbol two (2) has an index of #0001b, indicating that the immediately next symbol is a command symbol, at command symbol three (3). Command symbol three (3) has an index of #0000b; this indicates that no other command symbols are present in the command block.

While the foregoing example is presented with regard to a specific allocation of bits within the command symbol, it is appreciated that for other implementations, a greater (or fewer) number of bits would be necessary. For example, for technologies with eight (8) (or fewer) control symbols, the first portion may be truncated to three (3) bits; similarly for technologies with more control symbols, the first portion may be longer. Similarly, payloads that are longer (or shorter) may use a greater (or fewer) number of bits for the second portion.

Moreover, it is appreciated that in some variants, the aforementioned division may be flexibly implemented. For example, some systems may intermingle command symbols which reference other command symbols, and command symbols which do not reference other command symbols (i.e., use all bits for control symbol and eliminate the index). In other variants, complex commands may be constructed from multiple command symbols (e.g., a particular sequence of command symbols may have specific functionality, etc.).

In still other embodiments, a command symbol reference may not be limited to its own large data structure. For example, a command symbol may provide an index that addresses a command symbol in the next block or any subsequent blocks.

At step 408 of the method 400, the large data structures are transacted over the communications link. In one exemplary embodiment, a first portion of the command symbols are translated into control symbols which affect the physical layer transactions of the transmitter and receiver to ensure successful data transmission. For example, the associated control symbols may result in starting/stopping data, starting/stopping/resetting scramblers, etc.

At step 410 of the method 400, responsive to receiving the large data structures, a receiver identifies a first one of the one or more command symbols. In one exemplary embodiment, the receiver is configured to first identify a periodic demarcation point based on reception of and/or the contents of the received demarcation(s), e.g., header, pre-amble, mid-amble, post-amble, etc. In one such variant, the periodic demarcation point has a fixed relation to a command symbol. In other such variants, the periodic demarcation point may indicate the presence of a command symbol or a data symbol later in the stream. For example, an eight (8) bit header may be composed of two components, a first portion which is identifiable as a synchronization header, and the second portion provides a pointing reference to the location of a command symbol.

In some embodiments, the presence or location of a command symbol are based on other protocol or format constraints. In some cases, command symbols may be uniquely identified based on certain characteristics. For instance, within DisplayPort 8B/10B encoding, control and data symbols are represented by two non-overlapping and distinct sets of symbols; similar non-overlapping symbol ranges could be used herein. Other schemes based on explicit signaling, out-of-band-signaling, etc. may be used with equal success.

At step 412 of the method 400, the receiver identifies at least one subsequent command symbol based on the identified first one of the one or more command symbols. In one exemplary embodiment, for each identified command symbol (including, e.g., a first one associated with a header), the receiver splits the command symbol into its respective first portion (which represents a control symbol configured to affect physical layer transactions of the receiver) and the second portion (which indicates the location of the next command symbol). In some embodiments, the second portion provides a relative pointing reference to the location of the next command symbol (the number of data symbols interspersed between). In an alternate variant, the second portion provides an absolute reference to the location of the next command symbol (indicating the symbol number of the next command symbol). If there are no more subsequent command symbols (i.e., the receiver has identified the final command symbol within a large data structure that has been received), then the second portion may indicate (e.g., via a "null" reference or a lack of a reference or pointer) that there are no other command symbols present data structure instead of a reference to another command symbol. In another embodiment, the second portion instead points to another command symbol in another data structure, e.g., a subsequent 128B/130B (or 128B/132B) block.

At step 414 of the method 400, the receiver configures reception in accordance with the extracted control symbols, extracts the data symbols and renders the content.

Example Operation—

Various principles described herein are now presented with respect to one exemplary embodiment of DisplayPort MST operation. In the exemplary DisplayPort MST operation, the source and sink are connected in a unidirectional, continuous link (i.e., no other signaling intervenes). Those of ordinary skill in the related arts will readily appreciate that the following discussion is equally suited to other (e.g., more complex) network topologies, including, e.g., heterogeneous networks, tunneled networks, etc.

A DisplayPort Multistream packet (MTP) is sixty four (64) bytes (eight (8) bits). The first byte of the MTP is a header byte (denoted MTPH), and may be a control symbol or a data symbol. The remaining sixty three (63) bytes form slots for the transport of isochronous stream data. Each stream is allocated as many slots as necessary to satisfy the stream bandwidth requirements. The stream data may also include either control symbols or data symbols. MTPs are grouped together in frames, each frame includes 1024 MTPs. The MTPH control symbol at the start of a new frame is always configured to assert a scrambler reset (SR) control symbol, and this control symbol is used only in this position (i.e., the SR control symbol identifies the MTPH of the first MTP of a new frame).

Incipient requirements for most isochronous data applications stipulate that the frame time must be constant across the link. However, some variation in the delivery of MTPs, and MTP packet slots is acceptable.

DisplayPort solutions also support link training Link training is used for, e.g.: (i) bit clock synchronization, (ii) code block alignment in the receiver, (iii) signal conditioning (e.g., establishing appropriate levels of voltage swing, pre-emphasis in the transmitter and/or equalization in the receiver to support data transport with an acceptably low bit error rate), and (iv) in some cases, scrambler synchronization. Since link training occurs at a designated time, and is not repeated during normal operation, the code blocks used during training may be specialized for such a purpose (i.e., do not have to conform to normal operation). In fact, some embodiments may even use, e.g., 8B/10B symbols to train the link and then switch to 128B/130B (or 128B/132B) for normal operation (in particular, certain 8B/10B "comma" symbols may be useful in link training) However, ideal systems enable previously trained receivers (i.e. with known signal conditioning parameters) to lock onto an incoming stream without additional special training.

Under the exemplary DisplayPort 128B/132B (or 128B/130B) embodiment, the 128-bit payload consists of sixteen (16) eight (8) bit symbols which may be either command symbols, data symbols or null symbols. Each command symbol is configured to point to the next command symbol (or no symbol, if there are no command symbols in the rest of the payload).

In one embodiment, the first symbol is always a dummy command symbol; the resulting payload includes fifteen (15) eight (8) bit link layer symbols (i.e., either control, data, or null) per 130 bits (or 132 bits). This is an acceptable ~9% overhead. Thus, rather than attempting to implement complex logic to optimize for "data-only" blocks (which may yield diminishing returns in signaling overhead), the exemplary solution simply accepts that every block starts with a command symbol.

Under prior art 128B/130B (and 128B/132B) schemes, every sync header offered two (2) bits to distinguish between a command symbol and a data symbol. However, the exemplary embodiment necessarily follows the header with a command symbol; consequently, the header may be repurposed to distinguish between DisplayPort protocol payload blocks (where each block starts with a command symbol) and PHY blocks (used for, e.g., link training, resynchronization with the stream, scrambler resets, etc).

Moreover, the exemplary scheme conveniently operates within substantially the same frame time as legacy DisplayPort implementations, even with the dummy command symbol insertion. Recall that each legacy DisplayPort frame is based on sixty four (64) symbols per MTP multiplied by 1024 MTPs per frame; in total 65536 link layer symbols are provided in every DisplayPort Frame. Under the exemplary scheme (i.e., at least one dummy control symbol and fifteen link layer symbols), 65536 link layer symbols may be transmitted in 4369 blocks with one "runt" symbol (4369.06 blocks to be precise). However, the very first DisplayPort symbol of a frame is always a scrambler reset, so a special 132 bit block (or 130b block) may signal both scrambler reset and represent the MTPH of the first MTP in the frame (effectively "saving" the runt symbol). The result is that the special scrambler reset block allows for the 65535 DisplayPort symbols to be provided in precisely 4369 blocks. In some circumstances, it may be advisable to transmit several special scrambler reset blocks at frame boundaries to assist the resynchronization process, for robustness.

Finally, since the first symbol of every DisplayPort protocol payload block of the exemplary embodiment is a command symbol, the receiver may limit the impact of errors to one block in the worst case. For example, if a bit error occurs in the command symbol, the command symbol may be misinterpreted, and/or the link to the next command symbol may be lost. However, the command symbol at the start of the next block will re-synchronize the receiver, and recover the link operation.

Apparatus—

Figure 7:
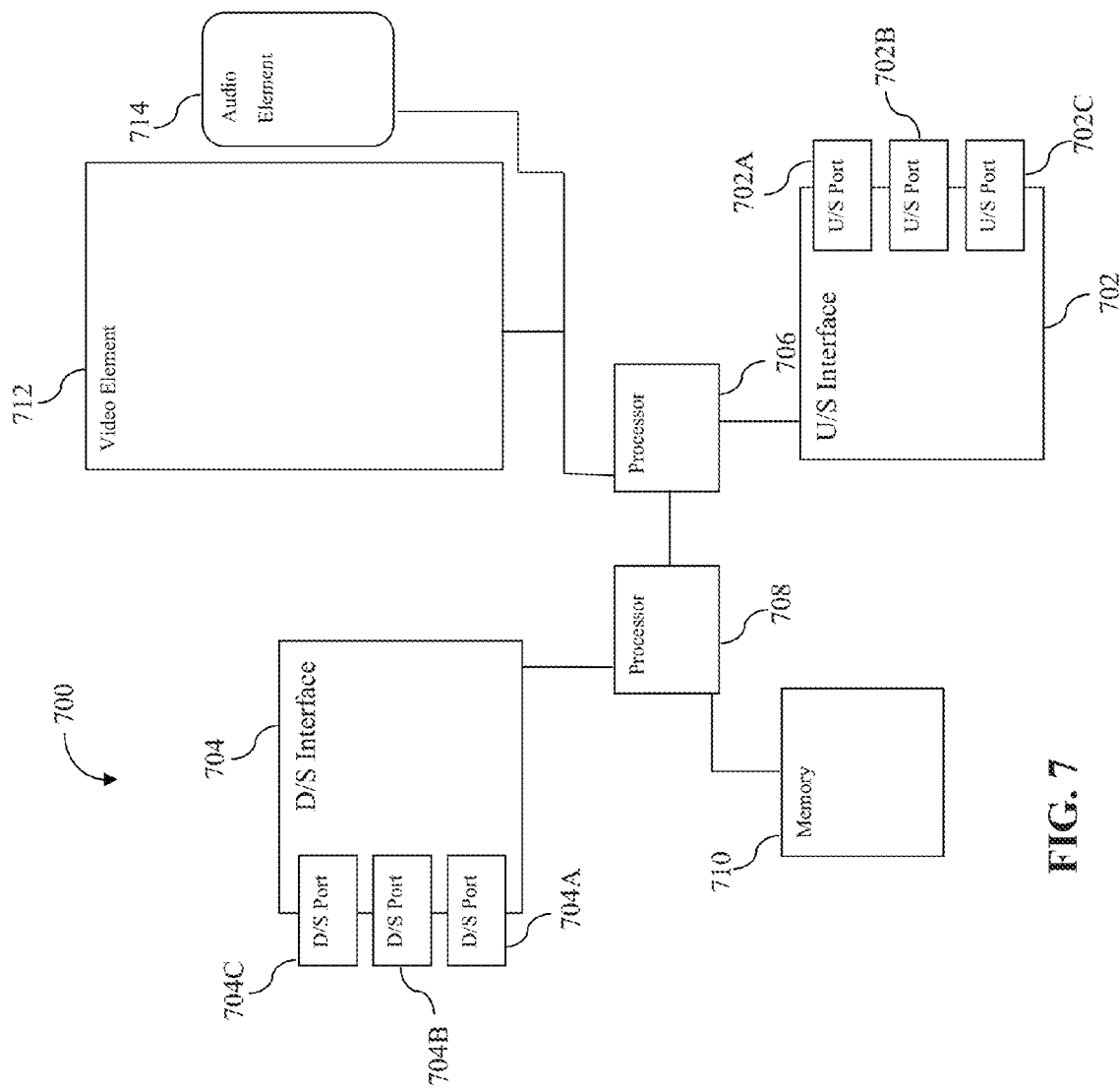
FIG. 7 is a logical block diagram representation of one exemplary audio/visual (A/V) apparatus configured to flexibly provision and/or receive control data within large data structures.

Referring now to FIG. 7, an exemplary apparatus 700 configured to flexibly provision/receive control data within large data structures is depicted. While a specific device configuration and layout is shown and discussed, it is recognized that various other implementations may be readily utilized by one of ordinary skill given the present disclosure, the apparatus 700 of FIG. 7 being merely illustrative of the broader principles.

The illustrated apparatus 700 of FIG. 7 is an A/V apparatus that includes an upstream plurality of ports, and corresponding receiving elements (e.g., receiving interfaces, transceiver interfaces) 702, a downstream plurality of ports and corresponding transmitting elements (e.g., transmitting interfaces, transceiver interfaces) 704, one or more digital processing elements 706, 708. Also included are memory elements (e.g., storage devices) 710, and audio 714 and video 712 elements.

It will be appreciated that not all elements are required in a single device to flexibly provision and/or receive control data within large data structures. For instance, a device that is only capable of source operation would not require upstream ports 702, or certain audio 714 or video 712 elements. Conversely, a sink device may not require downstream ports 704. Moreover, the "receiver" 702 and "transmitter" 704 elements may, in one embodiment, include transceivers capable of both transmission and reception if desired. As shown in FIG. 7, the upstream plurality of ports and associated receiving elements 702 includes one or more upstream auxiliary channels 702A, one or more upstream media ports 702B, and receiver apparatus 702C (e.g., multiplexing switches, reception logic, clock recovery circuitry, etc.).

In one exemplary embodiment, the auxiliary channel 702A is bi-directional, and carries management and device control data, and the upstream media ports 702B minimally include receivers for data lanes, and use of an embedded clock. In certain embodiments, the receiver apparatus 702C may be adapted to utilize a packet-based network protocol, such as the DisplayPort protocol previously described herein.

Similarly, the downstream plurality of ports and associated receiving elements 704 include one or more downstream auxiliary channels 704A, one or more downstream media ports 704B, and transmitter apparatus 704C (e.g., demultiplexing switches, transmission logic, clock embedding circuitry, etc.). In one exemplary embodiment, the auxiliary channel 704A is bi-directional, and carries management and device control data, and the downstream media ports 704B minimally include transmitters for data lanes, and inclusion of an embedded clock. As with the receiver, the transmitter apparatus 704C may be adapted to utilize a packet-based network protocol (e.g., DisplayPort).

The one or more data structures and the command and data symbols previously described herein may be included as part of transmission on any of the above ports (whether upstream, downstream, or bi-directional).

The processing elements 706, 708 may include one or more of central processing units (CPU) or digital processors, such as a microprocessor, digital signal processor, field-programmable gate array, reduced instruction set computers (RISC) core, or plurality of processing components mounted on one or more substrates.

Processing element 706 may include graphics processors, applications processors, and or audio processors. In "thin clients" the processing element 706 may be significantly reduced in complexity and limited to simple logic, or in extreme cases altogether non-existent.

The processing subsystem is in one embodiment tightly coupled to operational non-transitory computer readable memory, which may include for example SRAM, FLASH and SDRAM components. The processing subsystem may also include additional co-processors, such as a dedicated graphics accelerator, network processor (NP), or audio/video processor. As shown processing elements 706, 708 are discrete components; however, it is understood that in some embodiments they may be consolidated or fashioned in a SoC (system-on-chip) configuration.

The processing element 706 is, in the exemplary embodiment, adapted to receive one or more media streams from the upstream apparatus 702 for processing for media displays such as a video display 712, or audio speakers 714.

The additional processing element 708 may be adapted to provide one or more media streams to the downstream apparatus 704 for transmission to other networked devices. In certain embodiments, this processing element 708 receives one or more media streams from upstream data ports (e.g., as when operating as a branching or hub device). Alternatively, the processing element 708 may generate a media stream from memory subsystems, or media stream capture apparatus (e.g., video camera or microphone apparatus which are not shown).

Accordingly, the processing element 708 may be connected to a non-transitory computer-readable memory subsystem 710 including memory which may, for example, be hard disk drives, or solid state memory (e.g., RAM, FLASH) type components. The memory subsystem 710 may implement one or a more of direct memory access (DMA) type hardware, so as to facilitate data accesses, as is well known in the art.

The audio-visual system may include any number of well-known audio 714 and/or visual 712 components (including, without limitation: displays, backlights, such as vocoders, microphones, and speakers). Note that while a unidirectional "source-to-sink" model is utilized for most media delivery, the system may also utilize media flow multiplexed onto the reverse or upstream (auxiliary) channels, such as where a microphone co-located with a user display receives user-generated audio (speech, etc.), digitizes it, and sends it back upstream to the source device via the auxiliary channels. In one embodiment, the audio-visual system is configured to source data to the processing subsystem 706, 708. Alternatively, the data may be sourced to the downstream transmission port 704. This embodiment may utilize common "output" A/V devices, such as a video camera for video capture, and one or more microphones for audio capture.

It is recognized that in certain hardware or software applications, one or more of these components may be obviated. For example, component audio systems are typically implemented with only a single channel, or subset of the audio channels delivered to each audio component (e.g., subwoofer, and stereo surround channels). Similarly, some video components are not commonly used with audio inputs, e.g., projection equipment. In fact, in most typical networks for A/V processing, elements generally are substantially limited to one or two functional capabilities.

Figure 7A:
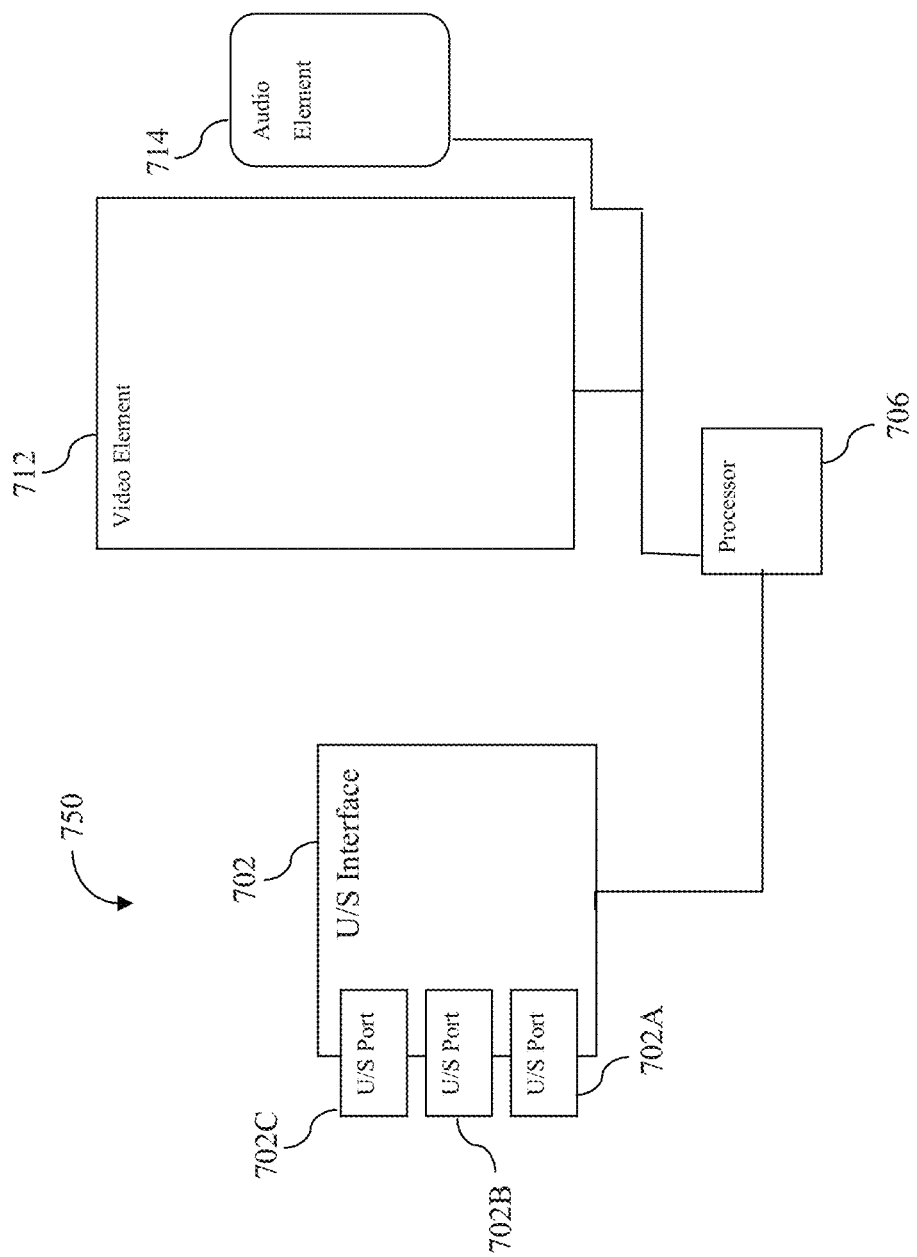
FIG. 7A is a logical block diagram representation of one exemplary sink apparatus.
Figure 7B:
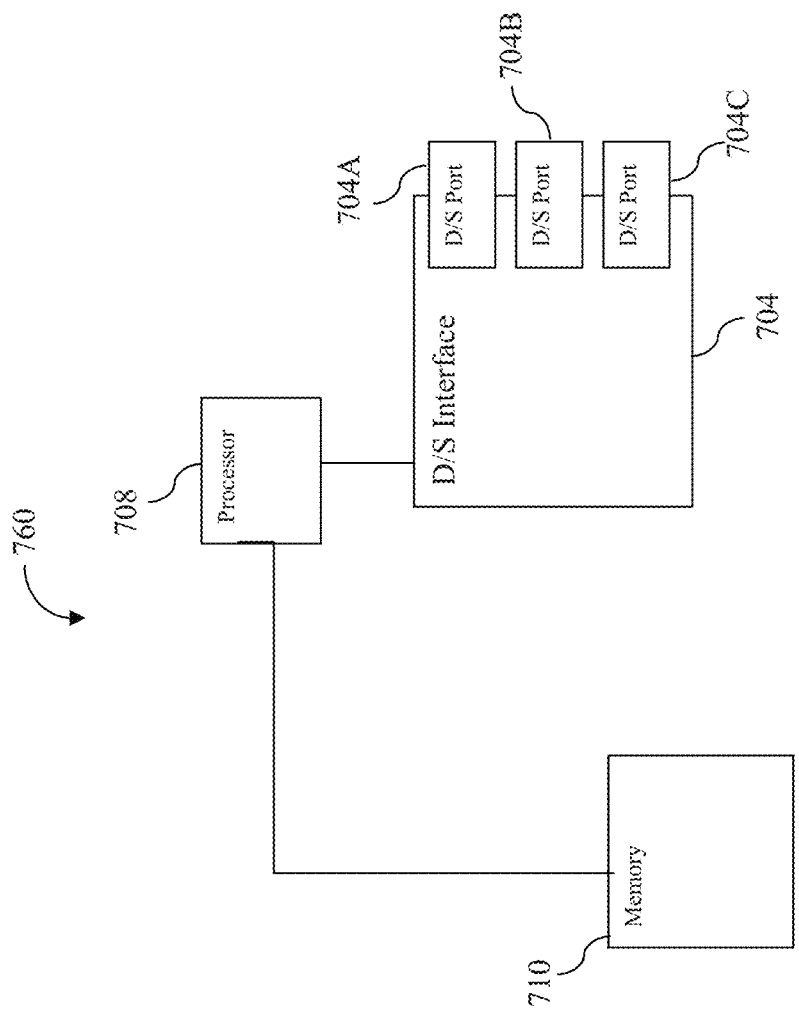
FIG. 7B is a logical block diagram representation of one exemplary source apparatus.
Figure 7C:
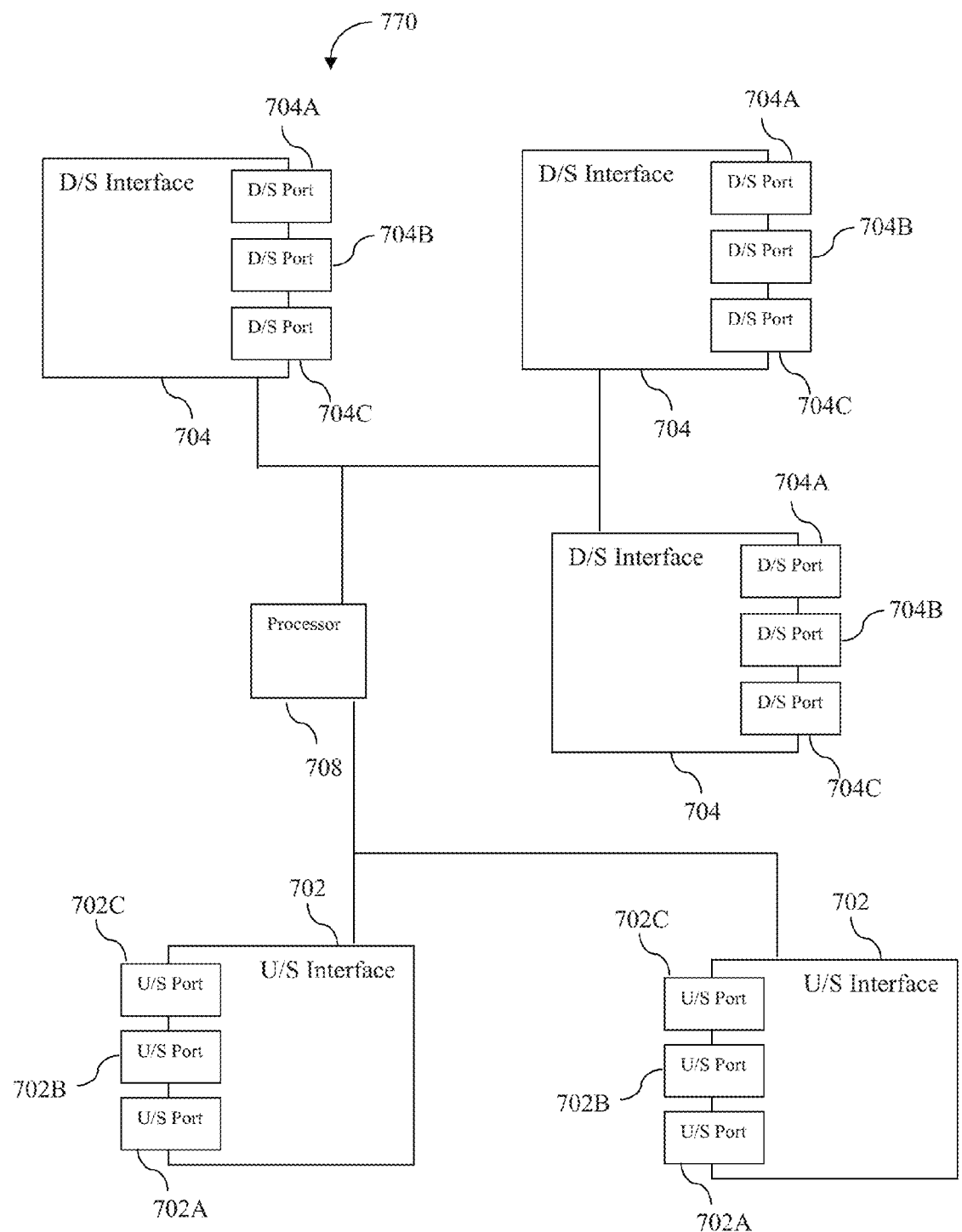
FIG. 7C is a logical block diagram representation of one exemplary branching apparatus.

Accordingly, referring now to FIGS. 7A, 7B, and 7C, representative embodiments of A/V apparatus having limited functionality are shown. Each of the illustrated apparatus is optimized for certain functionality. Such limited functionality apparatus may be advantageously used within "thin" client environments, e.g., in low-cost consumer applications, or in mobile devices where space and power conservation are at a premium. In some such systems, signal quality management functionality in accord with the principles and architectures described herein may be provided in the form a modular extensions (hardware-based and/or software-based) that may be readily added or removed from such a thin client system/environment. However, it will be appreciated that such modular extensions may be utilized in environments with more fully functional devices, which lack such signal analysis/control capabilities.

FIG. 7A illustrates exemplary sink apparatus 750 including an upstream plurality of ports and corresponding receiving elements 702, a processing element 706, and audio 714 or video 712 elements. Common exemplary embodiments of sink apparatus include displays, monitors, speakers, etc. Such sink components may consume one or more media streams, for example a 2 (two) channel speaker consumes 2 (two) audio streams. Some sink elements may also be network masters. For example, one common use scenario illustrating a sink mastered network includes a laptop receiving a video and audio stream from a web camera and microphone, respectively.

FIG. 7B depicts exemplary source apparatus 760 including a downstream plurality of ports and corresponding transmitting elements 704, a processing element 708, and memory subsystem 710. Common exemplary embodiments of source apparatus include computing devices, video cameras, microphones, etc. Such source components generate one or more output media streams. Some source components may also be network masters. For example, one common use scenario illustrating a source mastered network includes a server which provides audio and video streams to speakers and monitors, respectively.

FIG. 7C shows exemplary branching apparatus 770 including a downstream plurality of ports and corresponding transmitting elements 704, an upstream plurality of ports and corresponding receiving elements 702, and optionally a processing element 708. Common exemplary embodiments of branch apparatus include hubs, computing devices, etc. Such branch components may concentrate or multiplex incoming streams and split or de-multiplex outgoing streams. Branch components are generally "thin" clients; however some branch elements may also be network masters. For example, one common use scenario illustrating a branch mastered network includes a mixing table receiving a plurality of audio streams which are redistributed to a number of audio speakers.

It will be recognized that while certain implementations and embodiments are described in terms of a specific sequence of steps of a method, these descriptions are only illustrative of the broader principles and architectures presented herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the principles and architectures presented herein. This description is in no way meant to be limiting, but rather should be taken as illustrative of the general principles of the disclosure. The scope should be determined with reference to the claims.

What is claimed is:

1. An apparatus configured to flexibly provide control data within large data structures, comprising:
   a processing device;
   one or more ports; and
   a storage device in data communication with the processing device, the storage device comprising a plurality of instructions configured to, when executed, cause the processing device to:
      generate a stream of data symbols from content;
      insert one or more control symbols within the stream of data symbols to form a transport stream;
      subdivide the transport stream into large data structures, the subdivision comprising replacement of at least a first control symbol with a first command symbol; and
      transmit the large data structures via the one or more ports;
   wherein the first command symbol is configured to reference a second command symbol associated with a second control symbol; and
   wherein the referenced second command symbol resides in another large data structure separate from that of the first command symbol.

2. The apparatus of claim 1, wherein the apparatus further comprises one or more of: a video camera and/or microphone apparatus.

3. The apparatus of claim 1, wherein each of the large data structures comprises a header and a payload, the payload comprising a respective command symbol, each of the respective command symbols comprising a control function and a pointer, the pointer comprising a reference to a subsequent command symbol.

4. A method for flexible provision of control data within large data structures, comprising:
   generating a stream of data symbols from content;
   injecting one or more control symbols within the stream of data symbols to form a transport stream;
   subdividing the transport stream into large data structures, the subdividing comprising replacing at least a first control symbol with a first command symbol; and
   transmitting the large data structures;
   wherein the first command symbol comprises a control function and a pointer, and the pointer is configured to reference a location of a second command symbol associated with a second control symbol; and wherein the second command symbol resides in another large data structure separate from that of the first command symbol.

5. The method of claim 4, wherein the pointer references the location of the second command symbol relative to the first command symbol.

6. The method of claim 4, wherein the pointer references an absolute location of the second command symbol within the another large data structure.

7. The method of claim 4, wherein the subdividing further comprises sequencing at least the first command symbol and the second command symbol so as to provide a function separate from that provided by the control function of the first command symbol.

8. The method of claim 4, wherein the second command symbol is immediately subsequent to the first command symbol with no other command symbols between the first and second command symbols.

9. The method of claim 4, wherein each of the large data structures comprises at least a header and a payload.

10. The method of claim 9, wherein the payload comprises at least one of: an individual data symbol, a control symbol, and/or a null symbol.

11. The method of claim 9, wherein the first and second command symbols follow their respective header.

12. A non-transitory computer readable medium, the medium including instructions stored thereon which when executed by a processor are configured to cause an apparatus configured to flexibly receive control data within a large data structure to:
responsive to receiving the large data structure, identify a first one of one or more command symbols associated with a first control symbol;
identify at least one subsequent command symbol based on the identified first one of the one or more command symbols, the at least one subsequent command symbol being associated with a second control symbol; and
extract one or more data symbols in accordance with the first and second control symbols;
wherein the large data structure comprises a header configured to distinguish between a DisplayPort-based payload block and a physical layer (PHY) block, where the DisplayPort-based payload block starts with the one or more command symbols immediately subsequently to the header, and the PHY block only comprises the one or more data symbols; and
wherein the identified first one of the one or more command symbols comprises a control function and a pointer, and the pointer is configured to reference a location of the at least one subsequent command symbol associated with the second control symbol.

13. The non-transitory computer readable medium of claim 12, wherein the pointer is configured to reference (i) the location of the at least one subsequent command symbol relative to the identified first one of the one or more command symbols or (ii) an absolute location of the at least one subsequent command symbol.

14. The non-transitory computer readable medium of claim 12, wherein the at least one subsequent command symbol resides in another large data structure separate from that of the identified first one of the one or more command symbols.

15. The non-transitory computer readable medium of claim 14, wherein the identified first one of the one or more command symbols and the at least one subsequent command symbol follow their respective header.

16. The non-transitory computer readable medium of claim 12, wherein the at least one subsequent command symbol is immediately subsequent to the identified first one of the one or more command symbols with no other command symbols between the identified first one of the one or more command symbols and the at least one subsequent command symbol.

17. The non-transitory computer readable medium of claim 12, wherein the large data structure further comprises at least a payload.

18. The non-transitory computer readable medium of claim 17, wherein the payload comprises at least one of: an individual data symbol, a control symbol, and/or a null symbol.

19. The non-transitory computer readable medium of claim 14, wherein the identification of the first one of the one or more command symbols associated with the first control symbol comprises an identification of a demarcation point.

20. The non-transitory computer readable medium of claim 12, wherein each of the identified first one and the at least one subsequent command symbols comprises a respective first portion and a respective second portion, each respective first portion comprising a respective control symbol, and each respective second portion comprising a reference to a respective at least one subsequent command symbol.

\* \* \* \* \*